(12) United States Patent
Lexcellent et al.

(10) Patent No.: US 8,205,247 B2
(45) Date of Patent: Jun. 19, 2012

(54) METHOD OF AUTHENTICATING A CLIENT, IDENTITY AND SERVICE PROVIDERS, AUTHENTICATION AND AUTHENTICATION ASSERTION REQUEST SIGNALS AND CORRESPONDING COMPUTER PROGRAMS

(75) Inventors: Eric Lexcellent, Paris (FR); Gaël Gourmelen, Louannec (FR); Ariel Gordon, Boulogne (FR)

(73) Assignee: France Telecom, Paris (FR)

( * ) Notice: Subject to any disclaimer, the term of this patent is extended or adjusted under 35 U.S.C. 154(b) by 486 days.

(21) Appl. No.: 12/088,925

(22) PCT Filed: Oct. 4, 2006

(86) PCT No.: PCT/EP2006/067023
§ 371 (c)(1),
(2), (4) Date: Sep. 9, 2008

(87) PCT Pub. No.: WO2007/039618
PCT Pub. Date: Apr. 12, 2007

(65) Prior Publication Data
US 2009/0210930 A1      Aug. 20, 2009

(30) Foreign Application Priority Data

Oct. 5, 2005   (FR) ...................................... 05 10190

(51) Int. Cl.
*G06F 7/04* (2006.01)
(52) U.S. Cl. ........................................................... 726/4
(58) Field of Classification Search .......................... None
See application file for complete search history.

(56) References Cited

U.S. PATENT DOCUMENTS

| 2004/0128558 A1* | 7/2004 | Barrett ........................... 713/202 |
| 2006/0242424 A1* | 10/2006 | Kitchens et al. ............... 713/183 |

FOREIGN PATENT DOCUMENTS

| EP | 1 610 528 | 12/2005 |
| WO | WO 03/100544 | 12/2003 |

OTHER PUBLICATIONS

International Preliminary Report on Patentability from counterpart foreign 2008 Application No. PCT/EP2006/067023.
International Search Report from counterpart foreign Application No. 2007 PCT/EP2006/067023.
French Search Report from counterpart foreign Application No. FR 05/10190, 2006.

* cited by examiner

*Primary Examiner* — Brandon Hoffman
(74) *Attorney, Agent, or Firm* — David D. Brush; Westman, Champlin & Kelly, P.A.

(57) ABSTRACT

A method is provided of authenticating a client to access a service provided by a service provider, whereby the service provider queries an identity provider to verify identity of the client and authorize access the service. The method includes: verifying using the identity provider to verify that an identity level corresponding to an earlier authentication of the client is stored with the identity provider, and granting service access authorization to the client, which is performed either (i) directly following the verification step when the identity level required is less than the stored identity level, or (ii) after the following steps when the identity level required is greater than the stored identity level or when no client authentication is available, namely requesting authentication of the client having the required identity level and replacing the stored identity level with the required identity level if the client is authenticated by the identity provider.

9 Claims, 3 Drawing Sheets

METHOD OF AUTHENTICATING A CLIENT, IDENTITY AND SERVICE PROVIDERS, AUTHENTICATION AND AUTHENTICATION ASSERTION REQUEST SIGNALS AND CORRESPONDING COMPUTER PROGRAMS

CROSS-REFERENCE TO RELATED APPLICATIONS

This application is a Section 371 National Stage Application of International Application No. PCT/EP2006/067023, filed Oct. 4, 2006 and published as WO 2007/039618A2 on Apr. 12, 2007, not in English.

FIELD OF THE DISCLOSURE

The field of the disclosure is that of authentication.

More specifically, the disclosure relates to the authentication of clients during a request for access to one or more services provided by a service provider.

BACKGROUND OF THE DISCLOSURE

1. Prior Art

The systems of identity management are defined by different standardization organizations such as Liberty Alliance (which proposes the ID-FF or Identity Federation Framework) or OASIS (which defines SAML or Security Assertions Markup Language).

The architectures of these systems are based on the concepts of service providers (SP), identity providers (IdP) and the client:

The client corresponds to any type of entity whatsoever (for example an individual user, a group of users, an organizational entity, a machine, a software application, etc.) that can be identified and authenticated.

The services provider (SP) proposes one or more services that are accessible to the client when it is authenticated. This service may be, for example, an Internet on-line sale site providing products and/or services which cannot be ordered or paid for with the authentication of the client.

The identity provider (IdP) is an entity to which the service providers (SP) may delegate the authentication of a client.

These systems therefore offer clients SSO or single sign-on functions which enable successive access to different service providers without necessitating a systematic authentication of the client at each access to a new service. Classically, within these authentication architectures, the running of an interaction between a service provider and an identity provider is as follows:

1. The client requests access to a service at the level of the SP (for example access to his user account).
2. The SP then redirects the client to the IdP so that the SP obtains an assertion of authentication from the IdP giving an assurance that the client has been identified.
3. The client is requested to authenticate himself or itself (if he has not already done so during the access to another service) at the IdP level.
4. In the event of success, the IdP redirects the client to the SP. At the same time, it gives the SP an assertion of authentication that contains the information needed to create an authentication session for the client at the level of the SP. The client can then access the requested service.

This operation therefore assures the service provider that the client is correctly identified and authenticated while, at the same time, averting the need for the client to authenticate himself several times. Indeed, when several different service providers make use of a same identity provider, then the client does not need to authenticate himself or itself at each access to these different services.

2. Drawbacks of the Prior Art

A first drawback of this prior art technique is that, during the requests for authentication between the IdP and SP and during the processing operations internal to the IdP, the present-day identity management systems do not enable a distinction to be made between the different types of clients: for example individual users, groups of users (collective users), organizational entities, machines. These different types of clients can be led to coexist in a same IdP.

Another drawback of this prior art technique is that a given system is designed to process only one type of particular client. For example, an IdP would be made responsible for managing physical persons and another IdP for managing the organizational entities.

A corollary of the above drawback is that when a generic system is designed on the basis of an IdP managing different types of identities such as physical persons and organizational entities, then this IdP makes no distinction whatsoever between the different possible types of coexisting clients, and will therefore request an individual user to authenticate himself several times as a function of the identity required during the access to a service.

For example, in the case of a telecommunications operator, the general concept of a client covers:
- the individual user on the one hand, which is an individual identity for the identity management system,
- his home on the other hand, which is a group of individual identities and a collective identity for the identity management system.

In this example, the collective identity may be associated with an access, for example a telephone land line and it may be authenticated implicitly (without interaction with the user) by his address on a telecommunications network, contrary to individual authentication which requires interaction (between an identifier and a password for example).

A client therefore has two imbricated identities: an individual identity and a collective identity.

Now, the present-day identity management systems (IdP) cannot make the individual entity and the collective entity coexist and therefore work with the more generic concept of the individual user. A collective SP can in fact manage rights of access to its service only on a basis of individual identities.

Another drawback of this technique therefore is the complexification of the operations for updating information within this SP since, instead of being simply authorized to a collective identity, access is authorized to all the individual identities that form it.

Yet another drawback of this prior art technique is linked to the fact that problems of security then arise, the rights of administrator of the collective identity being then delegated to all the individual entities that form it.

Another drawback resulting from this prior art technique is that it leads to behavior calling for over-authentication whereas even this is not necessary as described in the following example: a user accessing his collective voice messaging service (his family's messaging service, for example the answering machine) is constrained by the IdP to authenticate himself explicitly and individually whereas the SP could have been satisfied with a collective authentication (authentication by the network address of the telephone set).

A last drawback of this prior art technique is that the benefits provided by the single sign-on (SSO) principle are lost: this leads, for example, to a systematic authentication of the user with different profiles depending on the information requested by the service provider.

SUMMARY

An aspect of the disclosure relates to a method for the authentication of a client wishing to access a service of a service provider, said service provider interrogating an identity provider to verify the identity of said client and authorize him to access said service.

According to an embodiment of the invention, such a method advantageously comprises:
- at least one step of verifying from said identity provider that an identity level corresponding to at least one previous authentication of said client is stored within said identity provider,
- a step of issuing an authorization of access to said service to said client, said step being performed:
  - either directly following said verification step should the identity level required for the access to said service be lower than said stored identity level,
  - or subsequently to the following steps should the identity level required for the access to said service be higher than said stored identity level or else should no authentication of the client be available:
    - request for authentication of said client meeting said required identity level,
    - replacement of said identity level stored by said required identity level if said client is authenticated by said identity provider following the step of said authentication request.

Thus, an embodiment of the invention relies on an inventive approach to client authentication within an identity providing system in procuring, for this system the capacity to integrate identity levels for a same client. These identity levels correspond to results of authentication of the client by different methods, according to requests sent out by the service providers, in order to authenticate this client.

According to an advantageous mode of implementation of the invention, said authorization of access to said service issued to said client takes the form of an assertion of authentication transmitted by said identity provider to said service provider, said assertion comprising the indication of said last identity level stored by said identity provider.

Thus, the transmission of the last identity level stored is done through an announcement identified within an existing structure without its being necessary to use a new protocol for data exchange between the identity provider and the service provider.

In a preferred embodiment of the invention, said identity level required by said service provider for access to a given predefined service is inserted by said service provider into its query requesting authentication of a client transmitted to said identity provider.

This insertion within an authentication request enables the use of the modes of interrogation of the service providers to transmit an additional piece of information intended for the service providers. Thus, in a same query, these service providers have available all the information needed to authenticate the client, such as for example: the address of the service provider, the identifier of the client, the requested identity level, etc.

An embodiment of the invention also relates to an arborescent structure for the hierarchical organization of a plurality of identity levels of at least one entity E from among a plurality of entities forming said structure, at least one of said identities forming said structure comprising at most one parent and n offspring, n being a natural integer.

According to an embodiment of the invention, in such a structure:
- at least one of said identities forming said structure comprises a single level of hierarchy of identities in said structure;
- said level of hierarchy of identities of said n offspring of an identity I of said entity E is higher than the level of hierarchy of identities of said identity I, so that if a request for authentication of said entity E is transmitted by a service provider to an identity provider, the latter compares the required identity level included in said request for authentication received from said service provider, with a last level of hierarchy of identities stored subsequently to a previous b authentication of said entity E.

In such a structure, each client has several levels of identity available. These levels of identity of a same entity E are laid out in an arborescent structure in such a way that the levels of identity of the leaves of the tree of the structure are those that will result from the strongest authentication that can be made by the identity provider. For example, the identity of a physical person as a member of an organizational entity will be of a level higher (the implication being that it will necessitate a finer graininess of the management of the rights or of the access data or authentication data) than the level of the identity of the organizational entity alone. The identity of this physical person could therefore for example be a leaf of the tree of the structure while the identity of the organizational entity could be the parent of the identity of the physical person in the structure. This structure can for example be described by an XML scheme or be implemented within a database.

An embodiment of the invention also relates to a device for the authentication of a client wishing to access a service of a service provider, said service provider interrogating an identity provider to verify the identity level required to authorize said client to access said service.

According to an embodiment of the invention, such a device comprises:
- at least one means of verifying from said identity provider that an identity level corresponding to at least one previous authentication of said client is stored within said identity provider,
- means of comparison of said identity level required for access to said service with said stored identity level;
- means of issuing an authorization of access to said service to said client, directly following the verification, by said verification means, that the identity level required for the access to said service is truly lower than said stored identity level,
- means of requesting authentication of said client meeting said required identity level should the identity level required for the access to said service be higher than said stored identity level or else should no authentication of the client be available:
- means of replacing said identity level stored by said required identity level if said client is authenticated by said identity provider in response to the query made by said authentication request means.

Advantageously, such a device may be implemented within an identity provider.

Thus, only one system is responsible for the authentication of the clients wishing to access the service. In an alternative embodiment of the invention, such an identity provider can also be distributed within a network and may have means available by which the different identity providers implementing this device can communicate with one another, thus giving the network the implicit capacity to authenticate any client whatsoever, whatever the service that this client wishes to access.

An embodiment of the invention also relates to an authentication requesting device enabling a service provider to request an identity provider for authentication of the identity of a client, in the form of an authorization of access enabling said client to access a service of said service provider.

According to an embodiment of the invention, such a device comprises means to obtain at least one piece of information from said identity provider representing a level of identity required for access to said service.

Advantageously, such a device can be implemented within a service provider.

An embodiment of the invention also relates to a computer program product downloadable from a communications network and/or stored in a computer-readable carrier and/or executable by a microprocessor. According to an embodiment of the invention, such a program comprises program code instructions for the implementation of the steps of the authentication method.

An embodiment of the invention also relates to a signal for the assertion of authentication designed to be exchanged between at least one identity provider and at least one service provider, following a request for access by a client to at least one of the services of said service provider and to a request for authentication of said client transmitted by said service provider to said identity provider. According to an embodiment of the invention, such a signal comprises at least one piece of information representing an identity level required by said service provider.

Finally, an embodiment of the invention pertains to an authentication query signal designed to be exchanged between at least one identity provider and at least one service provider following a request for access by a client to at least one of the services of said service provider. According to an embodiment of the invention, such a signal comprises at least one piece of information representing an identity level required by said service provider.

BRIEF DESCRIPTION OF THE DRAWINGS

Other features and advantages shall appear more clearly from the following description of a preferred embodiment, given by way of a simple illustratory and non-restricted example, and from the appended drawings of which.

DETAILED DESCRIPTION OF ILLUSTRATIVE EMBODIMENTS

Reminder of the Principle of an Embodiment of the Invention

In the context of an embodiment of the present invention, the description focuses therefore on the taking into account of an identity level of the clients by an identity provider in the client authentication context. The term "authentication" is understood to mean the verification of the identity of a client. The general context here is the one in which the notion of client is not limited to that of a physical individual who is a purchaser with a service provider or goods provider but pertains to any entity that can access resources, and forms part of a group of entities itself possibly forming part of a bigger group of entities, in doing so without limitation on imbrication, for example:

a pupil in a class, a class in a school;
an employee in a firm;
a set of computer equipment;
a distributed IT application;
an individual entity in an organizational entity, an organizational entity in another organizational entity.

In the case for example of pupils, a pupil in a class has several levels of identity:

his identity as an individual;
his identity as a pupil belonging to a class;
his identity as a pupil belonging to a school.

An embodiment of the invention therefore proposes to define an identity provider (IdP) having capacities of management of these client types and their different levels of identities and the interactions of these IdPs with the different SPs with which it is linked.

Figure 1:
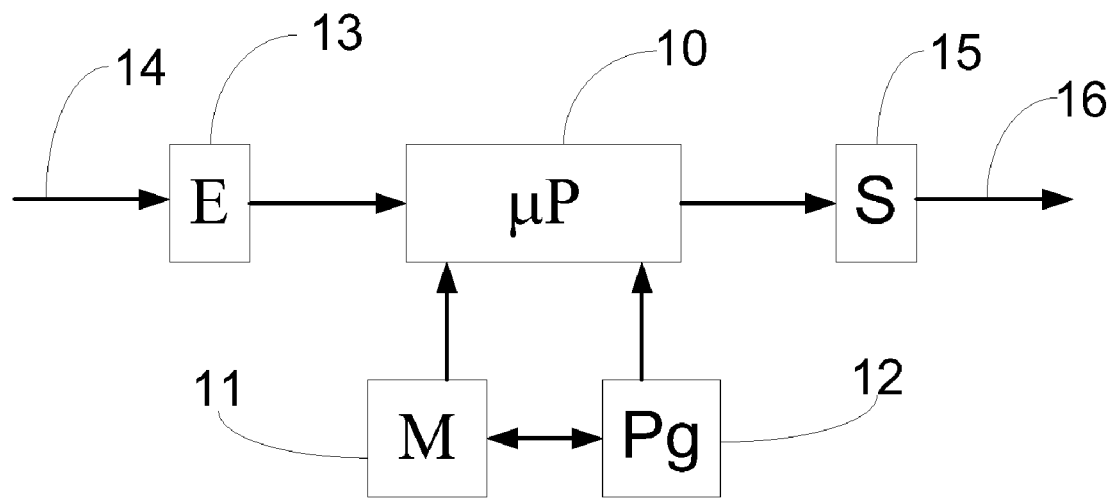
FIG. 1 provides a schematic illustration of the hardware structure of an identity provider.

The structure of the identity provider is illustrated schematically in FIG. 1. It comprises a memory M 11, and a processing unit 10 equipped with a microprocessor µP, which is driven by a computer program (or application) Pg 12. At input, the processing unit 10 receives, through a network input interface module E 13, client queries and/or responses 14 which the microprocessor µP processes, according to the instructions of the program Pg 12, to generate commands and/or responses 16, which are transmitted through a network output interface module S 15.

Figure 2:
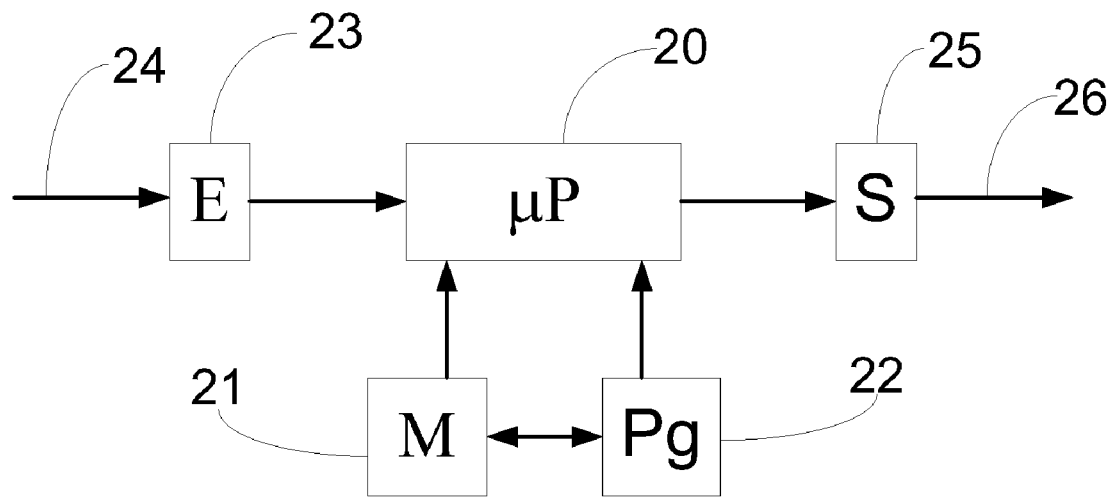
FIG. 2 provides a schematic view of the hardware structure of a service provider.

The structure of a service provider is illustrated schematically in FIG. 2. It comprises a memory M 21, and a processing unit 20 equipped with a microprocessor µP, which is driven by a computer program (or application) Pg 22. At input, the processing unit 20 receives, through a network input interface module E 23, client queries and/or responses 24 which the microprocessor µP processes, according to the instructions of the program Pg 22, to generate commands and/or responses 16, which are transmitted through a network output interface module S 25.

The general principle of an embodiment of the invention relies on:

The management, within the IdP, of different identity levels as well as relationships of membership between these levels, forming an arborescent structure.

For example, a "collective identity" level and an "individual identity" level are defined and links are defined (by means of the arborescent structure) which describe the fact that an individual identity belongs to a collective identity.

Each client announced in the arborescent structure is associated with a unique level.

An identity of a given level (for example an individual user) has as many identities (in addition to his own identity) in the identity management system as there are identity levels to which his identity level belongs (for example in the present case, an individual user has two identities, one individual identity and one collective identity).

The addition of a new parameter into the queries and responses exchanged between the IdP and the SP during the authentication phase enabling:

the SP to specify the identity level desired in the authentication query, the IdP to specify the identity level sent back in the authentication response.

Finally, a processing process is defined enabling the IdP to perform manipulations between the different identities of a user:

If the identity of a level that is lower (in the sense of membership) than the level requested by the SP is already authenticated at the level of the IdP, then, in order to generate its authentication response, the IdP does not need to re-authenticate the user at the level requested by the SP.

In a particular embodiment, the arborescent structure can then be defined as a database of the users enabling the definition of the relationships sustained between the identity levels of these users. In another embodiment, the arborescent structure may be defined as a simple XML file describing the identity levels with its ends (leaves) representing individual identities.

Figure 3:
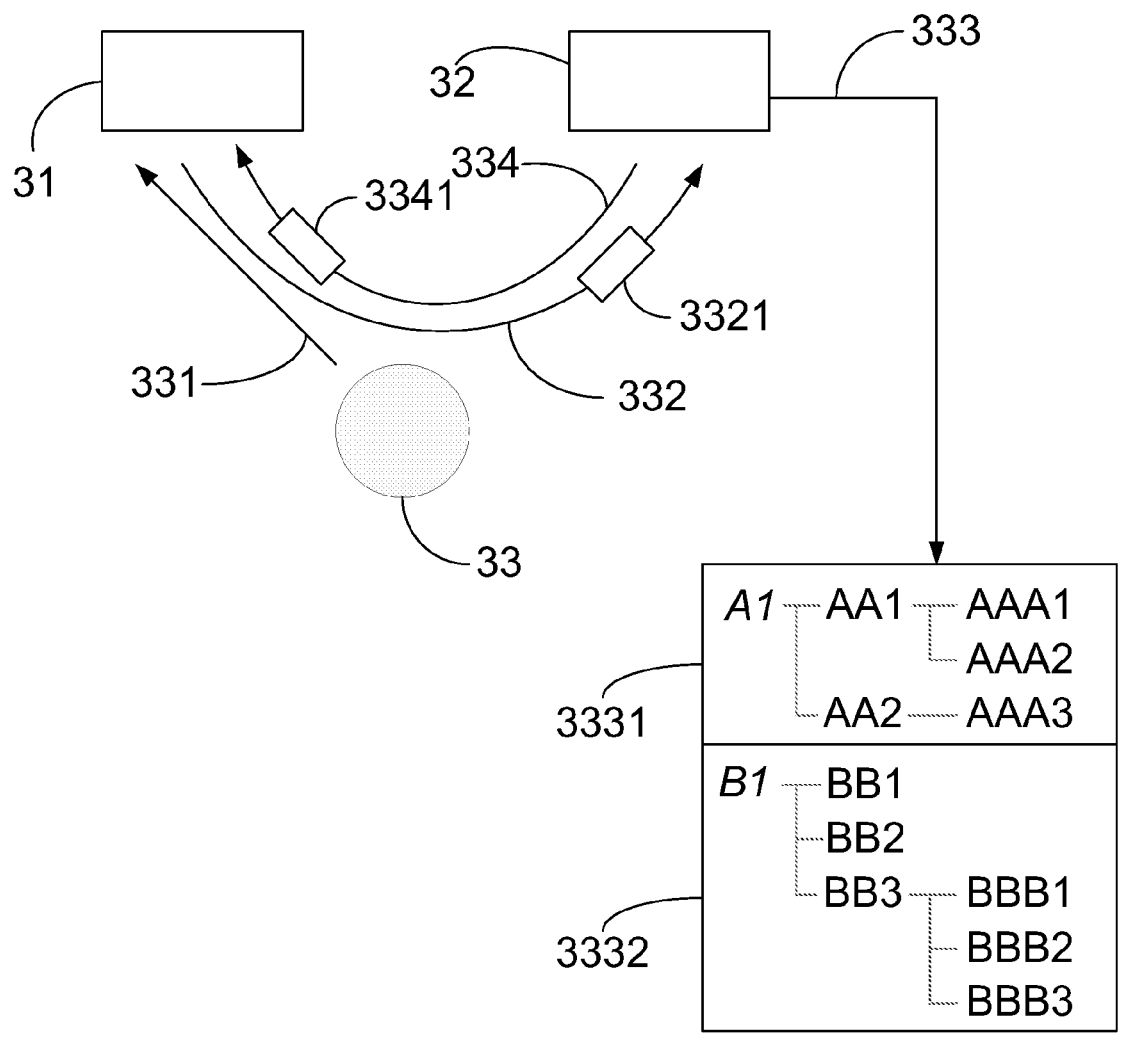
FIG. 3 describes the running of an interaction between an SP and an IdP in the context of a system managing several identity levels.

FIG. 3 presents the running of an interaction between an SP 31 and an IdP 32 in the context of a system managing several identity levels. In this example, the arborescent structure of the identities contains two main branches ($BR_A$ 3331 and $BR_B$ 3332) each having three levels of identities (A, AA, AAA, and B, BB, BBB). Each of these three identity levels gives access to specific services within the SP 31. It is assumed that the user is already authenticated within the IdP 32 by means of his individual level III identity (AAA3). The interaction between the SP 31 and the IdP 32 then runs as follows:

1. The user 33 requests (331) access to a service at the level of the SP 31.
2. The SP 31 redirects it (332) to the IdP 32 in order that it may obtain an assertion of authentication, specifying in its query 3321 that it wants a level II identity.
3. The IdP 32 verifies (333) that the user 33 is already authenticated within it under the level III identity AAA3. The IdP 32 therefore deduces that the identity AA2 is also authenticated (according to the processing rule of inclusion of the levels of identities).
4. The IdP 32 redirects (334) the user 33 to the SP 31 and gives (334) the SP 31 an assertion of authentication 3341 indicating that AA2 is authenticated. This assertion 3341 contains the information needed for the creation of an authentication session for the user 33 at the level of the SP 31. The IdP 32 specifies at the same time that the identity sent back is truly the level II identity. The user 33 can then access the requested service.

In another embodiment, it is possible for an identity of a given level to belong to several identities of an immediately higher level. In this example, the IdP performs a complementary step of choosing one or the other of the immediately higher identities as a function of the rules that may be predefined or of a context of execution.

Thus, in the above example, AA3 could belong to AA2 and to AA1. This is equivalent in a concrete situation to a person having a telephone line in his main residence and one in his secondary residence. This physical person is then modeled in the identity management system as an individual identity belonging to two collective identities. Depending on the context (i.e. the access point used, whether main or secondary) the system knows which collective identity to choose.

In another mode of implementation, it is also possible to associate one or more roles with an identity of a given level relative to an identity of an immediately higher level rather than manage solely the concept of membership. This could be equivalent, in a real context, to an environment in which users belong to a group and in this group one of the users has the administrator's role. For example, by adding information on roles to the arborescent structure of the identities, the tree can be read as follows:

"AAA1 belongs to AA1"

"AAA2 belongs to AA1 and furthermore is the administrator of AA1".

Here below, we shall present especially the case of an implementation in the OASIS "SAML" standard. It is clear however that the invention is not limited to this particular application but can also be implemented in other authentication systems, for example in those defined by the WS-trust standard and more generally in all cases where the goals listed here below are worthwhile.

Description of an Embodiment

The description shall focus now on a particular embodiment of the invention in the context of the OASIS "SAML" standard, in relation to the interactions between the SP and IdP defined in the above diagrams and presented with reference to FIG. 3.

Arborescent Structure of the Identities

Figure 4:
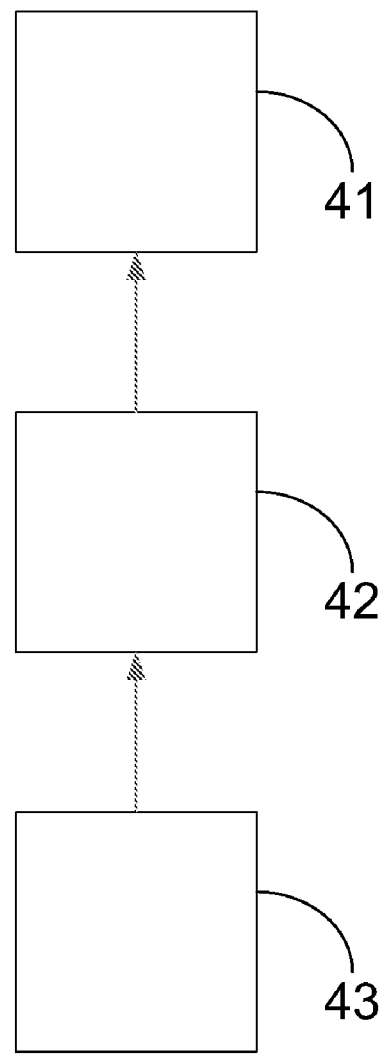
FIG. 4 is an example of modeling of the arborescent structure of the identity present on the IdP.

Referring to FIG. 4, we present an example of modeling (according to the unified modeling language or UML) of the arborescent structure of the identities present in the IdP. In this modeling, the identity tree comprises three levels. Each level is represented as an object (41, 42, 43). The level 41 is the lowest identity level. The level 42 inherits the properties of level 41 while raising its identity level. The level 43 inherits the properties of the level 42 and therefore those of the level 41 while at the same time raising its identity level. The advantage of this type of modeling is the possibility of defining properties of access and/or low level roles for identities integrating the level 41 and of assigning increasing rights to the lower-level identities.

The implementation of this structure may be done for example in the form of a relational database defining the identities and the relations maintained between them.

In another embodiment, the arborescent structure may be defined as an XML document enabling the hierarchical organization of the identities as a function of a basic identity defined as being the root of the XML document in question. Thus, the addition of a user in the structure is facilitated because it can be done directly into the file.

"SAML" Implementation

At present, the working frameworks of identity management such as "SAML" v2 (of which Liberty ID-FF 1.2 is a subset) do not take account of the fact that a system can manage different levels of identities. Thus, in the authentication queries/responses during the exchanges between the IdP and the SP, there is no XML element whose function corresponds to the management of these levels. An implementation of the invention within the "SAML" therefore consists of the creation of a new XML element for the authentication queries and responses. This new element has the following definition:

---

<SubjectType> [optional]
Specifies the identity level for the client indicated. If this optional parameter is omitted, the identity provider must, in his response, use the default value associated with the sender (SP). The sender of the query can use the value "urn:oasis:names:tc:SAML:2.0:subjecttype:any" to specify that the identity level of the indicated client is immaterial. The other specific values required are dependent on the arborescent structure defining the identity model implemented by the identity provider (IdP).
<xs:element name="SubjectType" type="xs:anyURI"/>

An example can be found below of an authentication query complying with the SAML standard sent by the SP to its IdP with this parameter: the SP specifies that it wants a collective level identity (identified by the markers <saml:SubjectType> and </saml:SubjectType>):

```
<AuthnRequest
ProviderName="http://www.provider.com"
IsPassive="false"
AssertionConsumerServiceIndex="1"
IssueInstant="2005-07-02T16:58:03.343Z"
Destination="http://identityprovideruri.com/idp?Module=Authn"
Version="2.0"
ID="dc7de3de-396f-42a5-965e-58b8b4e15363"
xmlns="urn:oasis:names:tc:SAML:2.0:protocol"
xmlns:saml="urn:oasis:names:tc:SAML:2.0:assertion">
<saml:Issuer>http://serviceprovider.com</saml:Issuer>
<saml:Subject>
<saml:SubjectType>
urn:oasis:names:tc:SAML:2.0:subjecttype:collective</saml:SubjectType>
</saml:Subject>
</AuthnRequest>
```

In response to the preceding query, the IdP sends back an authentication response (assertion) in which it specifies that it sends back a collective level identity (identified by the markers <saml:SubjectType> and </saml:SubjectType>):

```
<Response
Destination="http://serviceprovider.com/SAML/Authentication"
IssueInstant="2005-07-02T16:58:03.531Z"
InResponseTo="dc7de3de-396f-42a5-965e-58b8b4e15363"
ID="6a1c8111-9532-446e-9850-2ca9ff58e98d"
xmlns="urn:oasis:names:tc:SAML:2.0:protocol"
xmlns:saml="urn:oasis:names:tc:SAML:2.0:assertion">
<Status>
<StatusCode Value="urn:oasis:names:tc:SAML:2.0:status:Success"/>
</Status>
<saml:Issuer>http://identityprovideruri.com/</saml:Issuer>
<saml:Assertion IssueInstant="2005-07-02T16:58:03.546Z" Version="2.0"
ID="b2947acb-abf7-483a-b34a-33aa9ff8356f">
<saml:Issuer>http://identityprovideruri.com/</saml:Issuer>
<saml:Subject>
<saml:NameID>DSODSOKDSO</saml:NameID>
<saml:SubjectConfirmation Method="urn:oasis:names:tc:SAML:2.0:cm:bearer">
<saml:SubjectConfirmationData Recipient="http://serviceprovider.com/"
NotOnOrAfter="2005-07-02T17:02:56.593Z" NotBefore="2005-07-02T16:57:56.593Z"
InResponseTo="dc7de3de-396f-42a5-965e-58b8b4e15363"/>
</saml:SubjectConfirmation>
<saml:SubjectType>
urn:oasis:names:tc:SAML:2.0:subjecttype:collective</saml:SubjectType>
</saml:Subject>
<saml:Conditions NotOnOrAfter="2005-07-02T17:02:56.593Z" NotBefore="2005-07-02T16:57:56.593Z"/>
<saml:AuthnStatement SessionIndex="e0474917-8b2a-4fa5-bd7c-c9e4163ff5c8"
AuthnInstant="2005-07-02T16:57:56.593Z">
<saml:AuthnContext>
<saml:AuthnContextClassRef>
urn:oasis:names:tc:SAML:2.0:ac:classes:InternetProtocolPassword</saml:AuthnContext
ClassRef>
</saml:AuthnContext>
</saml:AuthnStatement>
</saml:Assertion>
</Response>
```

Scenario of Use

In this scenario, we examine the case of a telephone operator managing two types of identity:
   identity of the users which are individual identities,
   homes which are collective identities.

In the Martin family, which has three members, Robert, Julie and Alice, Alice wishes to access services through her Internet connection. She has in particular the following services (provided by her service provider):
   a collective voice messaging service for her telephone using the Internet connection (telephone under IP),
   a collective photo album,
   an individual electronic messaging system.

1. She accesses the collective "telephone IP voice messaging" SP.
2. The SP generates an authentication query for the IdP of the Martin family Internet access provider. It specifies in the request that it wishes a collective level identity.
3. The IdP identifies the Martin family implicitly through the network address of their Internet connection and sends the SP back an assertion of authentication containing the collective Martin family identity. It specifies that the identity sent back is of a collective level.
4. Alice then wishes to consult the voice messages (on the telephone answering machine) of the Martin family.
5. She then wishes to consult her email messages. She accesses the electronic messaging SP which generates an authentication query to the IdP specifying that it wishes an "individual" level identity.
6. The IdP, which does not have any individual level authentication session available for Alice, asks her to authenticate herself by entering her user name and password. This creates an individual level session for Alice at the IdP which replaces the previous collective session. The IdP then sends the SP back an authentication assertion containing the individual identity "Alice Martin" and specifies that the identity is sent back is an "individual" level identity.
7. Alice can then consult her personal electronic messages.

8. Alice wishes to access the collective photo album SP. This SP generates an authentication query to the IdP in specifying that it wishes to have a "collective" level identity.
9. The IdP has an individual authentication session available for Alice. It knows that Alice belongs to the collective identity known as the "Martin Family" through the arborescent structure, hence that it is the Martin family which is authenticated through Alice. It therefore generates an assertion of authentication for the SP containing the collective identity called the "Martin Family" and specifies that the identity sent back is of the collective level.
10. Alice can then look into the family photo album
11. If Alice later wishes to access an individual service, inasmuch as her individual session is still present at the IdP level, she will not have to get re-authenticated.

An aspect of the disclosure therefore provides an identity management system that can be used to make a distinction between the different types of identities of a same client. For example, the system would have to be capable of managing the collective identities and the individual identities that form them and thus enable the implementation of an identity provider that is capable of processing the demands for authentication by service providers in terms of both individual identities and collective identities. Thus, one and the same system could equally well take charge appropriately of the authentication of a physical user and the authentication of the organization to which he belongs in order to provide services matching the required level of identification, which present-day identity providers are incapable of doing. Furthermore, the system could organize the identities hierarchically so that it is capable of proposing a method of authentication to the client that matches the identity level required in order to access the service.

An aspect of the disclosure provides the IdP with the possibility of presenting the required level of identity to the SP without any need for a fresh authentication on the part of the client. For example, the services of the telecommunications operator are addressed to the individual identities (for example an electronic messaging service), to the collective identities (for example a voice messaging service on a telephone land line) or to both, the IdP would then be responsible for presenting the SP with the identity that is appropriate to its request.

An aspect of the disclosure simplifies the working and management of the services within the service provider by delegating all the authentication tasks to the identity provider and by eliminating complex updating tasks relative to clients of a certain type within the SP. Thus, it will no longer be necessary for an SP known as a collective SP to have knowledge of all the individual entities that form it in order to be able to provide its service.

Yet another aspect of the disclosure enables a significant increase in the security of access to the services ensuring that only individual clients can have administration rights.

Finally, an aspect of the disclosure offers greater convenience to the users especially by facilitating browsing on Internet sites and by complying with the single sign-on principle (SSO).

Although the present disclosure has been described with reference to one or more examples, workers skilled in the art will recognize that changes may be made in form and detail without departing from the scope of the disclosure and/or the appended claims.

The invention claimed is:

1. A method for authentication of a client wishing to access a service of a service provider, said service provider interrogating an identity provider to verify an identity of said client and authorize said client to access said service, wherein the method comprises:
    at least one step of verifying by said identity provider that an identity level, among a plurality of different identify levels, issued from at least one previous authentication of said client is stored within said identity provider, said identity level being a value that represents an authorization of said client in a given context, and stored in hierarchical structure that defines links between various ones of the plurality of identity levels, said links representing membership of the client in the linked identity levels; and
    a step of issuing from said identity provider an authorization of access to said service for said client, said step being performed:
        either directly following said verification step should the identity provider determine an identity level required for the access to said service is less restrictive than said stored identity level,
        or subsequently to the following steps by the identity provider should the identity provider determine the identity level required for the access to said service is more restrictive than said stored identity level or else should no authentication of the client be available:
            request for authentication of said client meeting said required identity level,
            replacement of said identity level stored by said required identity level if said client is authenticated by said identity provider following the step of said authentication request.

2. The method for the authentication of a client wishing to access a service of a service provider according to claim 1, wherein said authorization of access to said service issued for said client takes a form of an assertion of authentication transmitted by said identity provider to said service provider, said assertion comprising an indication of a last of said previous identity level stored by said identity provider.

3. The method for the authentication of a client wishing to access a service of a service provider according to of claim 1, wherein said identity level required by said service provider for access to a given predefined service is inserted by said service provider into its query requesting authentication of a client transmitted to said identity provider.

4. A non-transitory computer readable medium containing a hierarchical structure stored therein for hierarchical organization of a plurality of identity levels of identities of at least one entity E from among a plurality of entities forming said structure, at least one of said identities forming said structure comprising at most one parent and n offspring, n being a natural integer, said identity level being a value which represents an authorization of a client associated with said entity E in a given context, and stored in said hierarchical structure, wherein:
    said hierarchical structure defining links between various ones of the plurality of identity levels, said links representing membership of the entity E in the linked identity levels;
    at least one of said identities forming said structure comprises a single level of hierarchy of identities in said structure;
    said single level of hierarchy of identities of said n offspring of an identity I of said entity E is more restrictive than the single level of hierarchy of identities of said identity I, so that if a request for authentication of said entity E is transmitted by a service provider to an identity provider, the identity provider compares the required identity level included in said request for authentication received from said service provider with a last level of hierarchy of identities stored subsequently to a previous authentication of said entity E.

5. A device for authentication of a client wishing to access a service of a service provider, said service provider interrogating an identity provider to verify an identity level, among a plurality of different identity levels, required to authorize said client to access said service, wherein the device comprises:
- a verifier for verifying from said identity provider that an identity level issued from at least one previous authentication of said client is stored within said identity provider, said identity level being a value which represents an authorization of said client in a given context, and stored in a hierarchical structure that defines links between various ones of the plurality of identity levels, said links representing membership of the client in the linked identity levels;
- a comparator, which compares said identity level required for access to said service with said stored identity level;
- an issuer for issuing an authorization of access to said service for said client, directly following the verification, by said verifier, that the identity level required for the access to said service is less restrictive than said stored identity level,
- a requester for requesting authentication of said client meeting said required identity level should the identity level required for the access to said service be more restrictive than said stored identity level or else should no authentication of the client be available,
- a replacer for replacing said identity level stored by said required identity level if said client is authenticated in response to the query made by said requester.

6. An identity provider, which implements a device for authentication according to claim 5.

7. An authentication requesting device for a service provider to ask an identity provider for authentication of a client's identity, in a form of an authorization of access, enabling said client to access a service of said service provider,
- wherein the device comprises a processor configured for obtaining, from said identity provider, at least one piece of information representing an identity level, among a plurality of different identity levels, required for said service, said identity level being a value that represents an authorization of said client in a given context, and stored in a hierarchical structure in said identity provider, which defines links between various ones of the plurality of identity levels, said links representing membership of the client in the linked identity levels, and wherein said processor is also configured for obtaining, from said identity provider, an authorization of access to said service for said client.

8. An identity provider, which implements an authentication requesting device according to claim 7.

9. A non-transitory computer readable medium containing a computer program stored therein for causing a computer processor to perform a method for authenticating a client wishing to access a service of a service provider, said service provider interrogating an identity provider to verify an identity of said client and authorize said client to access said service wherein the method comprises:
- at least one step of verifying by said identity provider that an identity level, among a plurality of different identify levels, issued from at least one previous authentication of said client is stored within said identity provider, said identity level being a value which represents an authorization of said client in a given context, and stored in a hierarchical structure that defines links between various ones of the plurality of identity levels, said links representing membership of the client in the linked identity levels; and
- a step of issuing by said identity provider an authorization of access to said service for said client, said step being performed:
    - either directly following said verification step should the identity provider determine an identity level required for the access to said service be lower is less restrictive than said stored identity level,
    - or subsequently to the following steps by the identity provider should the identity provider determine the identity level required for the access to said service is more restrictive than said stored identity level or else should no authentication of the client be available:
        - request for authentication of said client meeting said required identity level,
        - replacement of said identity level stored by said required identity level if said client is authenticated by said identity provider following the step of said authentication request.

* * * * *